Aug. 18, 1953     R. J. SMITH     2,649,571
BRIDGE FOR RESISTANCE MEASUREMENT
Filed April 18, 1947
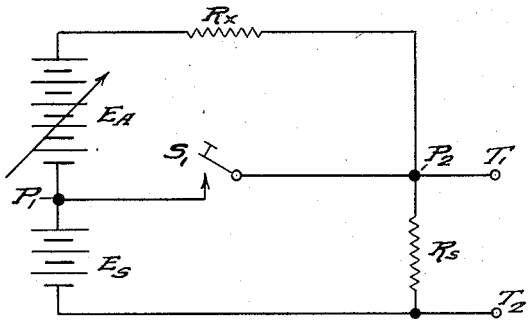
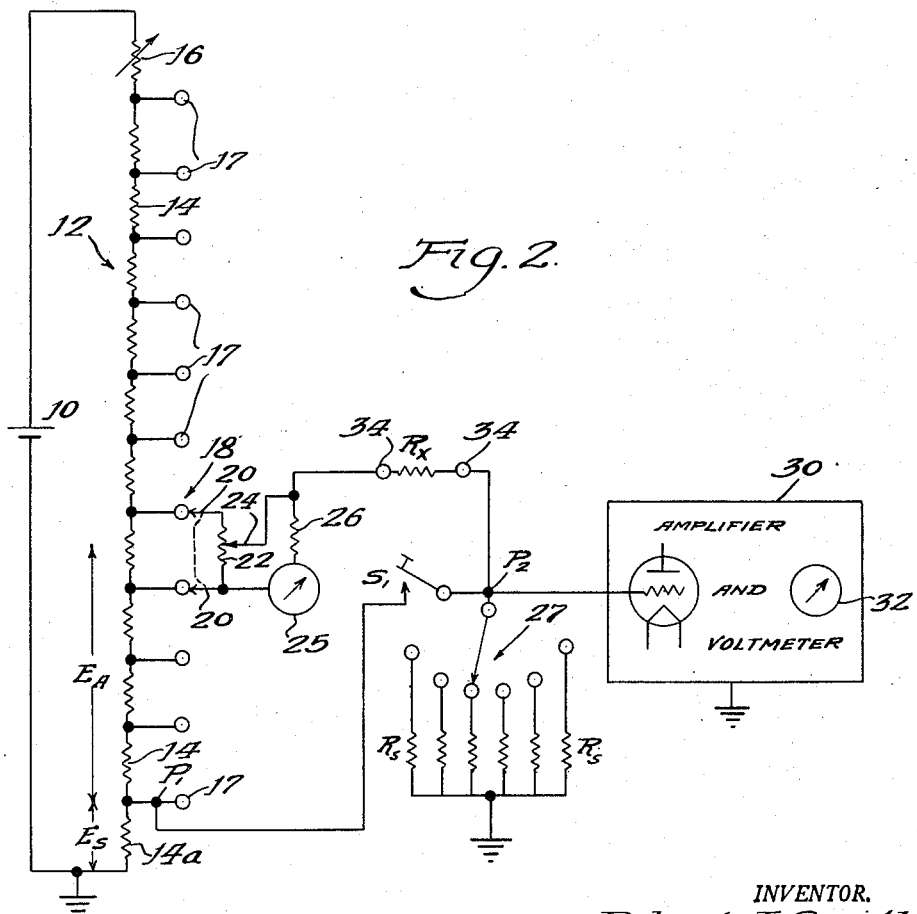
INVENTOR.
Robert J. Smith
BY
Robert A. Saunders
Attorney Patented Aug. 18, 1953

2,649,571

UNITED STATES PATENT OFFICE 2,649,571

BRIDGE FOR RESISTANCE MEASUREMENT

Robert J. Smith, Elmhurst, Ill., assignor to the United States of America as represented by the United States Atomic Energy Commission Application April 18, 1947, Serial No. 742,251

4 Claims. (Cl. 324—62)

1

This invention relates to an improvement in a method and means for measuring electrical impedances. More specifically, the invention concerns a novel ratio-arm bridge particularly well adapted for the measurement of resistances of high orders of magnitude and to an improved method for making such measurements.

A ratio-arm bridge such as a Wheatstone bridge is commonly used in the measurement of ordinary resistances. (It will be understood that the terms "resistance" or "impedance" as used herein and in the appended claims refers to the usual "linear" resistance or other electrical impedance, in which the current is directly proportional to the applied voltage.) Such bridges are commonly brought to balance by variation of a resistance which constitutes one of the ratio-arms. As is well known in the art, it is a requisite for high sensitivity in determining the null point that the resistances which constitute the other arms of the bridge should be of the same order of magnitude as the resistance under measurement. Such bridges, therefore, do not afford a satisfactory means for measuring resistances of the order of $10^9$ to $10^{13}$ ohms, since it is impossible presently to obtain continuously variable resistances of these orders of magnitude. Furthermore, in measuring such resistances in this manner, it is necessary to impress upon the resistance under measurement substantial voltages. Since it is characteristic of such resistances that the ohmic value varies with applied voltage, a measurement so obtained is not an accurate indication of the ohmic value in low-voltage applications.

Accordingly, it is the principal object of this invention to provide an improved method and apparatus for the measurement of high resistances of the order of $10^9$ to $10^{13}$ ohms.

It is a further object of the invention to provide a novel ratio-arm bridge suitable for the measurement of high resistances.

It is a further object of the invention to provide an improved method and apparatus for determining the balance or null point of a ratio-arm bridge.

For understanding of the invention, reference is made to the drawing, in which:

Fig. 1 is a schematic electrical diagram of a basic form of ratio-arm bridge embodying the teachings of this invention; and Fig. 2 is a schematic electrical diagram of a practical and convenient detailed embodiment of the basic bridge illustrated in Fig. 1.

Referring first to Fig. 1, a variable voltage

2 source $E_A$ and a fixed voltage source $E_S$ are connected in series, the negative terminal of the former being connected to the positive terminal of the latter. The positive terminal of the variable voltage source $E_A$ is connected to the unknown resistance $R_X$ under measurement, which is in turn connected to one terminal of a standard resistance $R_S$, the value of which is known. The other terminal of the standard resistance $R_S$ is connected, in turn, to the negative terminal of the fixed voltage source $E_S$. A shorting switch $S_1$ is connected between the junction point $P_1$ between the voltage sources and the junction point $P_2$ between the resistances. The voltage across the resistance $R_S$ appears at the output terminals $T_1$ and $T_2$.

When the switch $S_1$ is open the voltage across the resistor $R_S$ is equal to the quantity $$\frac{R_S}{R_S+R_X}(E_A+E_S)$$

When the switch $S_1$ is closed, the voltage across the resistance $R_S$ equals $E_S$. It may readily be shown that if the ratio of $E_A$ to $E_S$ is the same as the ratio of $R_X$ to $R_S$, then in either condition of the switch $S_1$, the voltage across the resistance $R_S$ equals $E_S$. In any other condition of the bridge, the voltage across the resistance $R_S$ will change as the switch $S_1$ is opened and closed. Therefore, by variation of the variable voltage source $E_A$, a condition may be induced such that the voltage appearing between the terminals $T_1$ and $T_2$ does not change as the shorting switch $S_1$ is opened and closed. The value of the voltage source $E_S$ being known, and the value of the voltage source $E_A$ being known as, for example, by calibration or measurement, the ratio of the unknown resistance $R_X$ to the known standard resistance $R_S$ may readily be computed.

It will be seen that the basic circuit of Fig. 1 requires no variation of high resistances in order to achieve balance. Furthermore, the apparatus and method for determining the null point offers great advantage in the measurement of high resistances. In a conventional bridge, the measurement would be made either with a sensitive galvanometer or with a vacuum-tube microammeter. Sensitive galvanometers are, of course, delicate and awkward to handle. The vacuum tube microammeter is likewise not satisfactory in such an application because it is necessary with such a device to make relatively complex adjustments before making each measurement in order to obviate errors due to drift in the vacuum-tube microammeter. The null-indicating point is subject to drift in such a device, and it is, therefore, necessary to set this null-indicating point each time before the unknown resistance $R_x$ is inserted into the bridge. With the arrangement illustrated in Fig. 1, drift in the instrument which is used to measure the voltage drop across the resistance $R_s$ will have no appreciable effect on the validity of the measurement. It is only necessary that the null point remain constant for the very short time which is required to close or open the switch.

An additional advantage of the system of Fig. 1 is that very low voltages, of the order of tenths of a volt, may be impressed on both the unknown resistance and the standard resistance in making the measurement.

In Fig. 2 there appears a circuit of a practical laboratory or production-line bridge for the measurement of a wide range of high value resistances embodying the basic circuit of Fig. 1.

A battery 10, for example 1.5 volts, supplies voltage to a voltage divider generally designated by the numeral 12 which consists of eleven resistors 14, one of the eleven being designated by the numeral 14a. The resistors 14 are preferably of low value, for example 10 ohms. It is essential for proper operation that the resistors 14 be exactly equal in ohmic value. A variable resistor 16 is placed in series with the battery 10 and the voltage divider 12 in order to provide exact adjustment of the voltage supplied to the latter. The junction between the variable resistor 16 and the voltage divider 12 and the junctions between each of the resistors 14 are connected to the stationary terminals 17 of a multi-position switch generally designated by the numeral 18. The switch 18 has two moving contacts 20 which are ganged together as indicated by the dotted line in the drawing. The ten positions of the switch 18 correspond to the contacts 20 being connected across each of the resistances 14, except the resistor designated as 14a.

A resistor 22, for example 3,000 ohms, having a continuously variable tap 24 is connected between the contacts 20. A microammeter 25 is connected in series with a resistor 26 between the tap 24 and one of the contacts 20 to constitute a voltmeter measuring the voltage appearing across the tapped portion of the resistance 22. The tap 24 is connected through the unknown resistance $R_x$ to a point $P_2$. The point $P_2$ is also connected to one terminal of the shorting switch $S_1$, the other terminal of which is connected to the point $P_1$ between the end resistor 14a and the first of the other ten resistors 14. The point $P_2$ is also connected to the stationary contact of a selector switch 27 which connects the point $P_2$ to ground, and thus to the other terminal of the resistor 14a (which is grounded), through one of a number of standard high resistances $R_s$. The resistances $R_s$ are preferably of ohmic values equal to powers of 10, as for example, $10^7$, $10^8$, $10^9$, $10^{10}$, $10^{11}$, and $10^{12}$ ohms. The point $P_2$ is connected to the input of an amplifier and voltmeter 30 having an indicating meter 32 showing the voltage appearing at the input. Binding post terminals 34 are provided for ready insertion of resistors $R_x$ under measurement.

It will readily be seen that the voltage appearing across the resistor 14a of Fig. 2 corresponds to the voltage source $E_s$ of Fig. 1. Likewise the voltage appearing between the point $P_1$ and the tap 24 of Fig. 2 corresponds to the voltage source $E_A$ of Fig. 1. Operation of the circuit illustrated in Fig. 2 is preferably as follows:

The switch 18 is moved to the maximum (uppermost, in the drawing) position. The switch $S_1$ is opened and closed at various positions of the switch 27 until the order of magnitude of the unknown resistance $R_x$ is determined. It will readily be seen that when the order of magnitude of the resistance $R_x$ is greater than the value of the resistance $R_s$ at any given position of the switch 27, the effect on the meter 32 of closing the switch $S_1$ will be opposite in direction to that which will be produced when $R_x$ is of a lower order of magnitude than $R_s$. The order of magnitude thus being ascertained, the switch 27 is left in the proper position and the switch 18 is operated so as to give a minimum deflection of the meter 32 by the opening and closing of the switch $S_1$. The final adjustment in making the measurement is the adjustment of the tap 24 to eliminate the effect of opening and closing the switch $S_1$ on the indication of the meter 32.

The determination of the values of unknown resistances $R_x$ from the null positions of the switches 27 and 18 and the tap 24 can be made very simple. The switch 27 may have a panel dial indicating the magnitudes of the respective resistances $R_s$. The positions of the switch 18 may likewise be indicated by panel indications such as "X1," "X2," etc., increasing multipliers corresponding to greater values of $E_A$ (higher positions of the switch 18, in the drawing). The meter 25 preferably has a full scale deflection corresponding to the total voltage appearing across any one of the resistors 14, for example 0.1 volt. It may be calibrated from zero to 1.0 in, for example, steps of one tenth, as ".1," ".2," etc. Thus the value of the unknown resistance $R_x$ may be read virtually directly.

As an example, suppose that the null position of the various controls mentioned above is as illustrated in the drawing. Then the position of the switch 27 would read, for example, "$10^{10}$." The position of the switch 18 would read "4." Suppose further that the indication of the meter 25 is ".55." Then the value of the resistance $R_x$ is $4.55 \times 10^{10}$ ohms.

It will readily be seen that the slow drifts in the amplifier and voltmeter 30 will have no effect on the reading. However, in order that the decimal reading obtained from the meter 25 be accurate, it is necessary that the voltage across the voltage divider 12 be such that full scale deflection of the meter 25 is reached when the tap 24 is at the position of maximum voltage. Such adjustment may be made from time to time by means of the variable resistor 16.

When resistances of the order of greater than $10^{10}$ ohms are under measurement, it may be necessary, because of the long time constants involved, to wait a few seconds after the closing or opening of the switch $S_1$ to determine the effect on the indication of the meter 32.

It will be readily apparent that the usual precautions as to insulation resistance and cleanliness must be used in the physical construction of the device schematically illustrated in the drawing.

Persons skilled in the art will readily devise methods and apparatus utilizing the teachings of this invention other than those described above and illustrated in the drawing. For example, the method and means for indication of the null point of the ratio-arm bridge described above may readily be applied to other bridges. Likewise the bridge described above may be used with conventional types of null-detecting devices. Furthermore, persons skilled in the art will readily observe that similar devices and methods may be utilized in applications other than the measurement of resistances.

What is claimed is:

1. A bridge for the measurement of resistances comprising, in combination, a fixed standard source of voltage, a second source of voltage variable in value from zero to a value at least ten times the value of said standard source, said second source of voltage being connected in series with said standard source, a plurality of standard resistances having ohmic values corresponding approximately to integral powers of ten, switching means for selectively connecting one of said standard resistances in series with the voltage sources and with a resistance under measurement, shorting switch means for connecting and disconnecting the junction point between the standard resistance and the resistance under measurement with the junction point between said voltage sources, and means for measuring the voltage across the standard resistance.

2. A bridge for the measurement of resistance comprising: a series circuit having, in succession, a standard resistor, a fixed voltage source, a variable voltage source connected in series aiding, and two terminals connected respectively to the variable voltage source and to the standard resistor and adapted for the insertion of a resistor to be measured; switch means for directly connecting the junction of the voltage sources with the junction of the standard resistor and the terminal to which it is connected; and means for detecting a change in voltage across the standard resistor as said junction points are connected and disconnected.

3. The bridge of claim 2 wherein there are provided a plurality of standard resistors having ohmic values corresponding to integral powers of 10, and switching means for selectively inserting said standard resistors, whereby the position of the switching means and the ratio of the variable voltage to the fixed voltage at bridge balance constitute a direct numerical indication of the value of an unknown resistance.

4. The bridge of claim 3 wherein the variable voltage source comprises 10 series-connected potential sources, each equal to the fixed voltage source, a resistor having a variable tap thereon, and switching means for connecting said resistor selectively across any one of said 10 potential sources, whereby the position of said last switching means and said tap constitute a direct decimal-system numerical indication of said voltage ratio at bridge balance.

ROBERT J. SMITH.

References Cited in the file of this patent

UNITED STATES PATENTS

| Number | Name | Date |
|---|---|---|
| 1,917,417 | Zuschlag | July 11, 1933 |
| 2,094,318 | Failla | Sept. 28, 1937 |
| 2,095,305 | Allison | Oct. 12, 1937 |
| 2,145,866 | Failla | Feb. 7, 1939 |
| 2,371,636 | McConnell | Mar. 20, 1945 |
| 2,409,419 | Christaldi | Oct. 15, 1946 |

OTHER REFERENCES

"Technical Electricity," by Davidge and Hutchinson, 4th edition, page 149, published by University Tutorial Press Ltd., 1922.